(12) United States Patent
Cheong

(10) Patent No.: US 6,663,194 B2
(45) Date of Patent: Dec. 16, 2003

(54) SOLENOID VALVE FOR BRAKE SYSTEMS

(75) Inventor: Byeong-Hoo Cheong, Anyang (KR)

(73) Assignee: Mando Corporation, Pyungtak (KR)

( * ) Notice: Subject to any disclaimer, the term of this patent is extended or adjusted under 35 U.S.C. 154(b) by 0 days.

(21) Appl. No.: 10/098,034

(22) Filed: Mar. 15, 2002

(65) Prior Publication Data

US 2003/0038536 A1 Feb. 27, 2003

(30) Foreign Application Priority Data

Aug. 21, 2001 (KR) .......................................... 2001-50305
Dec. 5, 2001 (KR) .......................................... 2001-76402

(51) Int. Cl.[7] ................................ B60T 8/38; B60T 8/36
(52) U.S. Cl. ................................ 303/117.1; 303/119.2; 137/630; 137/630.22; 251/129.19
(58) Field of Search .......................... 303/119.1, 119.2, 303/117.1; 137/629, 630, 630.14, 630.15, 630.19, 630.22; 251/83, 129.01, 129.19

(56) References Cited

U.S. PATENT DOCUMENTS

| 3,961,645 | A | * | 6/1976 | Kagan ................... 137/630.15 |
| 4,782,862 | A | * | 11/1988 | Nguyen ................. 137/630.14 |
| 5,060,689 | A | * | 10/1991 | Csaszar et al. ............. 137/515 |
| 5,228,597 | A | * | 7/1993 | Low ......................... 222/129.1 |
| 5,529,152 | A | * | 6/1996 | Hamilton et al. ......... 188/266.6 |
| 5,535,725 | A | * | 7/1996 | Baker et al. ................ 123/520 |
| 5,577,815 | A | * | 11/1996 | Hashida ................... 303/119.2 |
| 5,711,583 | A |   | 1/1998 | Bareiss et al. ........... 303/119.2 |
| 5,967,627 | A | * | 10/1999 | Hosoya et al. ........... 303/119.2 |
| 6,084,493 | A | * | 7/2000 | Siegel ......................... 335/278 |
| 6,276,764 | B1 | * | 8/2001 | Park ......................... 303/119.2 |
| 6,309,033 | B1 | * | 10/2001 | Zaviska ................... 303/119.2 |

FOREIGN PATENT DOCUMENTS

GB 1511255 A * 5/1978

OTHER PUBLICATIONS

English Abstract for CN 1250840 Publication Date Apr. 19, 2000.*

* cited by examiner

Primary Examiner—Jack Lavinder
Assistant Examiner—Melody M. Burch
(74) Attorney, Agent, or Firm—Ladas & Parry

(57) ABSTRACT

A solenoid valve for brake systems, including a spool movably set in a valve housing, provided along its central axis with the first orifice which has a predetermined diameter, and provided at a position around the plunger with a plunger guide having a predetermined depth for allowing the plunger to enter the spool, thus opening and closing the first orifice. A valve seat portion is formed on the inner surface of the bore of the valve housing by stepping the surface. This valve seat portion defines the second orifice therein, and comes into contact with or spaced from the end of the spool to selectively open the outlet, separately from the first orifice when the spool moves in either direction. The second orifice has an inner diameter larger than that of the first orifice. A spool restoring spring normally biases the spool toward the plunger.

6 Claims, 7 Drawing Sheets

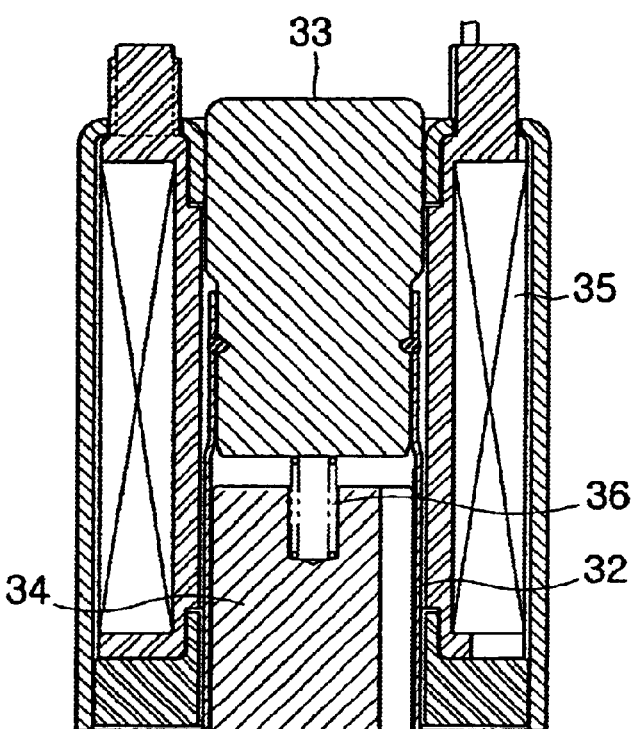
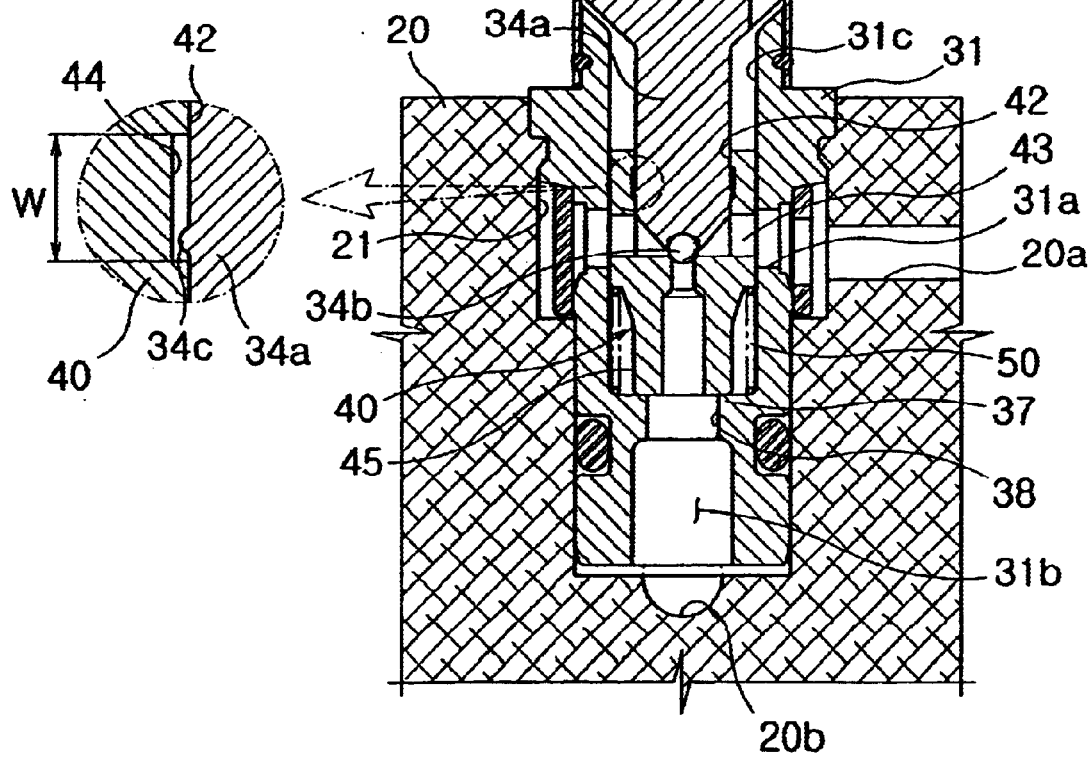
FIG. 2A
FIG. 2B

SOLENOID VALVE FOR BRAKE SYSTEMS

BACKGROUND OF THE INVENTION

1. Field of the Invention

The present invention relates generally to a solenoid valve for brake systems, and more particularly, to a solenoid valve for brake systems, which is designed to sequentially open or close its fluid passage in two stages, thus being easily opened or closed even under excessive braking pressure, as well as allowing the fluid passage to be widely opened.

2. Description of the Prior Art

Generally, an anti-lock brake system (ABS) for vehicles is installed at a position on the brake fluid line so as to interrupt and adjust braking pressure which is applied to the wheels. Such an ABS is provided with a plurality of solenoid valves for selectively opening the fluid line of the ABS in response to control signals.

Such a solenoid valve for ABSs, as shown in FIG. 1, is pressure-fitted into a valve fitting hole 14 of a modulator block 13, and has a hollow valve housing 1 which is provided with an inlet 3 and an outlet 4. Fluid flows from the inlet 3 to the outlet 4.

A cylindrical sleeve 6 is coupled to an end of the valve housing 1. An armature 5 is axially installed in the sleeve 6 such that it can axially move in opposite directions. A valve core 7 is fitted into the open end of the sleeve 6, thus closing the open end of the sleeve 6 as well as biasing the armature 5. In order to selectively open the orifice 8a of a valve seat portion 8 in response to an axial movement of the armature 5 in either direction, a plunger 5a extends into the valve seat portion 8 which is formed in the bore 2 of the valve housing 1. In this case, the plunger 5a is formed on the end of the armature 5 in such a way as to be integrated with the armature 5.

A restoring spring 9 is installed between the armature 5 and the valve core 7, and applies an elastic restoring force to the armature 5 such that the armature 5 normally keeps the orifice 8a closed. Further, an exciting coil 10 is installed at a position outside of both the sleeve 6 and the valve core 7 for activating the armature 5.

In this solenoid valve, when electric power is applied to the exciting coil 10, an electromagnetic force is generated between the valve core 7 and the armature 5. As the armature 5 moves toward the valve core 7 by the electromagnetic force, the orifice 8a of the valve seat portion 8 is opened. On the other hand, when electric power is not applied to the exciting coil 10, the electromagnetic force does not occur. At this time, the armature 5 is returned to its original position by the elastic force of the restoring spring 9, so the orifice 8a is closed.

However, such a conventional solenoid valve has a problem in that an excessively large electromagnetic force is required to open the orifice 8a by actuating the armature 5, because the initial actuation of the armature 5 is not smooth due to the pressure of the inlet 3, when the plunger 5a of the armature 5 closes the orifice 8a and the pressure of the inlet 3 is large.

Furthermore, in order to accomplish rapid rising in braking pressure by opening and closing the solenoid valves for brake systems, the cross-sectional area (opening ratio of the passage) of the orifice 8a has to be large in order to allow a large quantity of fluid to pass. However, the conventional solenoid valve has another problem that its opening and closing action has poor reliability, because an excessively large force is required to open the valve due to the increased pressure of the inlet 3, as the cross-sectional area of the orifice 8a becomes large. Thus, in an effort to solve the problem, there has been proposed another solenoid valve, which is designed to be easily opened and closed by applying a large force (electromagnetic force) to the armature 5. In this case, the solenoid valve has a further problem in that it generates much operating noise. In addition, said solenoid valve has still another problem in that the volume of the exciting coil 10 has to be large to generate a large magnetic force.

SUMMARY OF THE INVENTION

Accordingly, the present invention has been made keeping in mind the above problems occurring in the prior art, and an object of the present invention is to provide a solenoid valve for brake systems, which is sequentially opened or closed in two stages, thus being easily opened or closed with a weak force even when unexpected large braking pressure is applied to an inlet of the valve. In addition, the present invention provides a solenoid valve, which is designed to widely open its fluid passage, thus rapidly increasing the pressure of the fluid line of a brake system.

In order to accomplish the above object, the present invention provides a solenoid valve for brake systems having a hollow valve housing provided on its outer circumferential surface with a fluid inlet and provided on its lower end with a fluid outlet, and an armature provided with a plunger extending into a bore of the valve housing in such a way as to selectively open a fluid passage from the inlet to the outlet while moving by electric power, said solenoid valve comprising: a spool movably set in the valve housing, provided along its central axis with the first orifice having a predetermined diameter, and provided at a position around the plunger with a plunger guide having a predetermined depth for allowing the plunger to enter the spool and open or close the first orifice; a valve seat portion formed on the inner surface of the bore of the valve housing by stepping the surface, defining a second orifice therein and coming into contact with or spaced from the end of the spool to selectively open the outlet separately from the first orifice when the spool moves in either direction, the second orifice having an inner diameter larger than that of the first orifice; and a spool restoring spring biasing the spool toward the plunger.

According to the present invention, a stopping means is provided on each of the inner surface of the plunger guide and the outer surface of the plunger, and allows the plunger to move relative to the spool within a predetermined range. The stopping means of the plunger guide is caught by the stopping means of the plunger to allow the spool to be pulled by the plunger when the plunger moves beyond the predetermined range. Further, the stopping means includes a recess formed on the inner surface of the plunger guide, and having a predetermined width in an axial direction of the spool, and a locking projection protruding from the outer surface of the plunger so as to engage with the recess.

In this invention, a spring holding portion is formed on the outer surface of the spool at a position around the valve seat portion, defining a space for seating the spool restoring spring, and having an outer diameter smaller than an inner diameter of the bore of the valve housing for allowing fluid to flow from the inlet to the outlet when the spool is spaced from the valve seat portion.

According to this invention, at least one radial path is formed on the plunger guide of the spool such that the first orifice communicates with the inlet through the radial path.

Furthermore, in the present invention, a reinforcing member, made of a material having strength higher than that of the valve seat portion, is installed on the valve seat portion to prevent the valve seat portion from being deformed when the valve seat portion comes into contact with the spool.

BRIEF DESCRIPTION OF THE DRAWINGS

The above and other objects, features and other advantages of the present invention will be more clearly understood from the following detailed description taken in conjunction with the accompanying drawings, in which:

FIG. 2A and FIG. 2B are sectional views of a solenoid valve for brake systems according to the primary embodiment of this invention;

DESCRIPTION OF THE PREFERRED EMBODIMENTS

Figure 1:
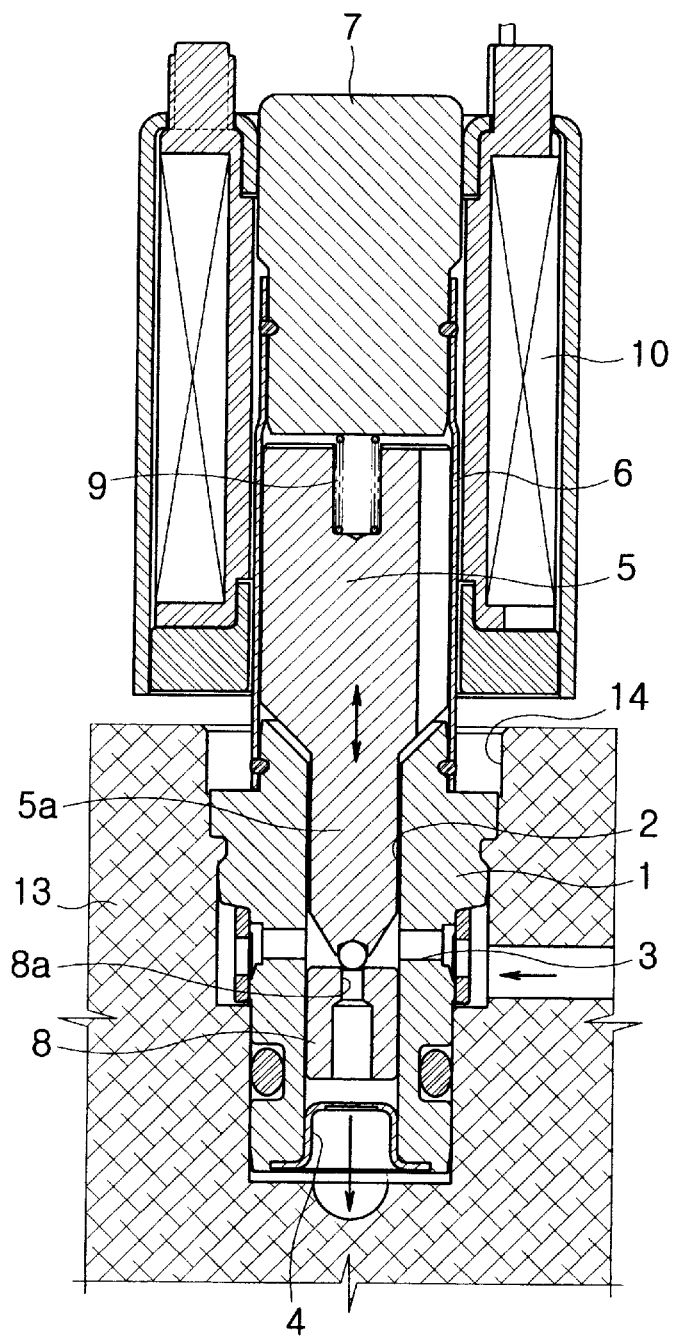
FIG. 1 is a sectional view of a solenoid valve for brake systems according to the prior art.

Reference now should be made to the drawings, in which the same reference numerals are used throughout the different drawings to designate the same or similar components.

As shown in FIG. 2A, the solenoid valve for brake systems according to this invention is pressure-fitted into the valve fitting hole 21 of a modulator block 20 which is provided on its interior with a plurality of fluid passages 20a and 20b. The solenoid valve has a hollow valve housing 31. The inlet 31a of the valve housing 31 communicates with the fluid passage 20a of the modulator block 20 while the outlet 31b communicates with the fluid passage 20b of the modulator block 20.

A cylindrical hollow sleeve 32 is coupled to the outer surface of the valve housing 31. A magnetic valve core 33 is fitted into the open end of the sleeve 32 which extends to the outside of the valve fitting hole 21. That is, the sleeve 32 is closed by the valve core 33 at its open end. A cylindrical armature 34 is set in the sleeve 32 in such a way as to retractably move in the sleeve 32 in an axial direction, thus opening and closing the fluid passages of the valve housing 31. In this case, the upper portion of the armature 34 is slidably supported on the inner surface of the sleeve 32. The armature 34 is provided on its lower portion with a plunger 34a. The plunger 34a is tapered at its lower section in a direction from the top to the bottom, and axially inserted into the bore 31c of the valve housing 31. An on-off ball 34b for opening and closing the fluid passage, is mounted at the lower end of the plunger 34a.

An exciting coil 35 is installed outside the sleeve 32 and the valve core 33, and moves the armature 34 installed in the sleeve 32 in opposite directions. In order to bias the armature 34 toward the valve housing 31 when electric power is not applied to the exciting coil 35, a restoring spring 36 is installed between the upper portion of the armature 34 in the sleeve 32 and the valve core 33, and elastically supports the armature 34 relative to the core 33. A spool 40 is set in the bore 31c of the valve housing 31 where the plunger 34a of the armature 34 retractably moves. The spool 40 also retractably moves in the bore 31c such that the fluid passage of the valve is sequentially opened or closed in two stages.

Figure 3:
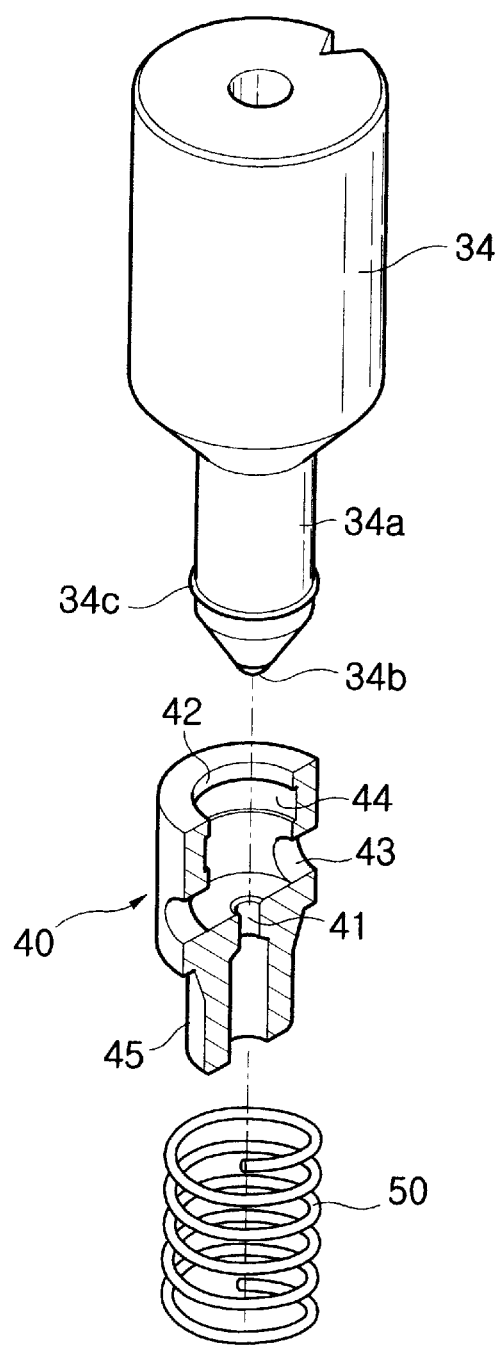
FIG. 3 is an exploded perspective view of a spool included in the solenoid valve of this invention.
Figure 4B:
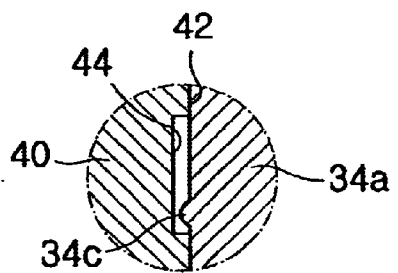
FIGS. 4A, 4B, 5, and 6 are detailed sectional views showing the sequential operation for opening and closing the fluid passage of the solenoid valve according to this invention.
Figure 4A:
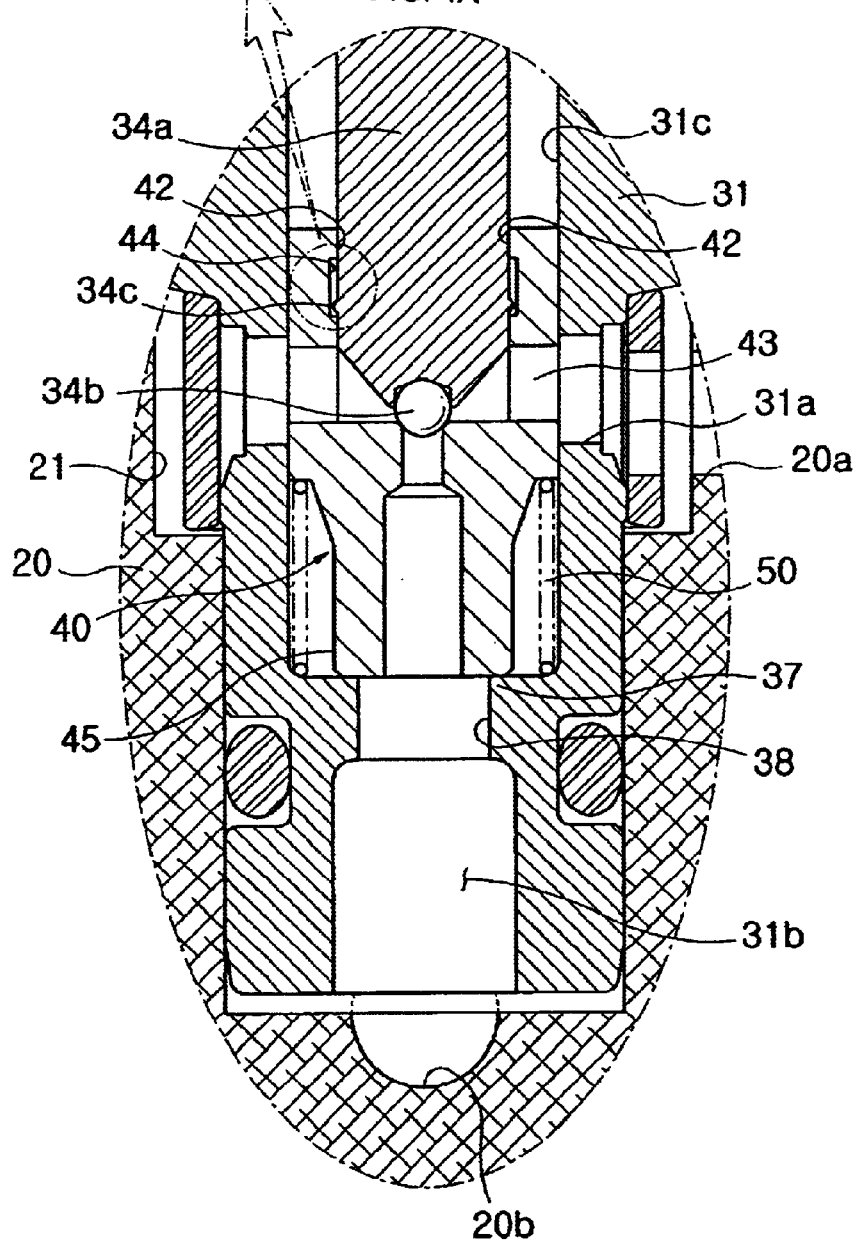

As shown in FIGS. 3 and 4A, the spool 40 is designed such that its outer surface is slidably supported on the inner surface of the bore 31c of the valve housing 31. Further, the spool 40 has a cylindrical shape, and is hollow along its central axis to allow fluid to flow therethrough. A first orifice 41, having a predetermined diameter, is thus formed along the central axis of the spool 40 for controlling the flow of the fluid, as well as opening and closing the valve. A plunger guide 42 is formed on the spool 40 at a position above the first orifice 41, and allows the plunger 34a to enter the guide 42 at a predetermined depth, thus opening or closing the first orifice 41 by the on-off ball 34b mounted at the lower end of the plunger 34a when the plunger 34a retractably moves in an axial direction. In this case, the plunger guide 42 is designed such that its inner diameter is almost equal to the outer diameter of the plunger 34a, thus slidably supporting the plunger 34a with the inner surface of the guide 42 being in contact with the outer surface of the plunger 34a. A radial path 43 is formed on the plunger guide 42, and allows the fluid to flow from the inlet 31a of the valve housing 31 to the first orifice 41.

A valve seat portion 37 is formed in the bore 31c of the valve housing 31 at a position adjacent to the lower end of the spool 40, and comes into contact with or is spaced from the lower end of the spool 40 to selectively open the outlet 31b separately from the first orifice 41 when the spool 40 moves in either direction. The valve seat portion 37 is annularly formed on the inner surface of the bore 31c by stepping the surface, and defines a second orifice 38. The second orifice 38 has an inner diameter larger than that of the first orifice 41.

A stepped spring holding portion 45 is formed on the outer surface of the spool 40 at a position around the valve seat portion 37, and has an outer diameter smaller than the inner diameter of the bore 31c of the valve housing 31 to define a space for seating a spool restoring spring 50 which normally biases the spool 40 toward the armature 34. Furthermore, the spool restoring spring 50 is a conventional compression coil spring which is fitted over the outer surface of the spring holding portion 45. The spool restoring spring 50 is designed such that its upper end is supported by the spool 40 whereas its lower end is supported by the upper surface of the valve seat 37. Such a structure allows a space for seating the spool restoring spring 50 to be defined between the inner surface of the bore 31c of the valve housing 31 and the outer surface of the spring holding portion 45 of the spool 40. In addition, when the spool 40 moves up, the structure allows the fluid to directly flow form the inlet 31a of the valve housing 31 to the second orifice 38 through the space outside the spring holding portion 45. (See FIG. 6)

In this case, the elastic force of the spool restoring spring 50 is smaller than that of the restoring spring 36 which biases the armature 34. When electric power is not applied to the exciting coil 35, such a construction with the two springs 36 and 50 allows both the first orifice 41 and the second orifice 38 to be closed while the plunger 34a and the spool 40 move down by the elastic force of the restoring spring 36.

A stopping means is formed on each of the inner surface of the plunger guide 42 and the outer surface of the plunger 34a, and allows the spool 40 to be pulled by the plunger 34a so that the lower end of the spool 40 is spaced from the valve seat portion 37, when the plunger 34a moves up beyond a predetermined range. The stopping means allows the plunger 34a to move relative to the spool 40 within a predetermined range. However, the stopping means of the plunger guide 42 is caught by the stopping means of the plunger 34a to allow the spool 40 to be pulled by the plunger 34a when the plunger 34a moves beyond the predetermined range. The stopping means consists of a recess 44 formed on the inner surface of the plunger guide 42, and a locking projection 34c formed on the outer surface of the plunger 34a. The recess 44 has a predetermined width W in an axial direction of the spool 40. The locking projection 34c protrudes from the outer surface of the plunger 34a, and is movably received in the recess 44 so as to be caught by an end of the recess 44 when the plunger 34a moves up. The plunger 34a provided with the locking projection 34c is forcibly fitted into the plunger guide 42 of the spool 40 through a hot pressure-fitting. When the plunger 34a moves into the plunger guide 42, the locking projection 34c is brought into movable engagement with the recess 44, thus allowing the plunger 34a to move relative to the spool 40 within a predetermined range which is defined by the width of the recess. It is preferable to round the outer surface of the locking projection 34c, in order to smoothly fit the plunger 34a into the plunger guide 42.

The opening and closing operation of the solenoid valve for brake systems according to this invention is as follows.

When electric power is not applied to the exciting coil 35, as shown in FIG. 4, the elastic force of the restoring spring 36 overcomes that of the spool restoring spring 50, thus biasing the armature 34 toward the spool 40. At this time, the first orifice 41 is closed by the on-off ball 34b mounted at the lower end of the plunger 34a, and the second orifice 38 is kept close by the lower end of the spool 40.

Figure 5:
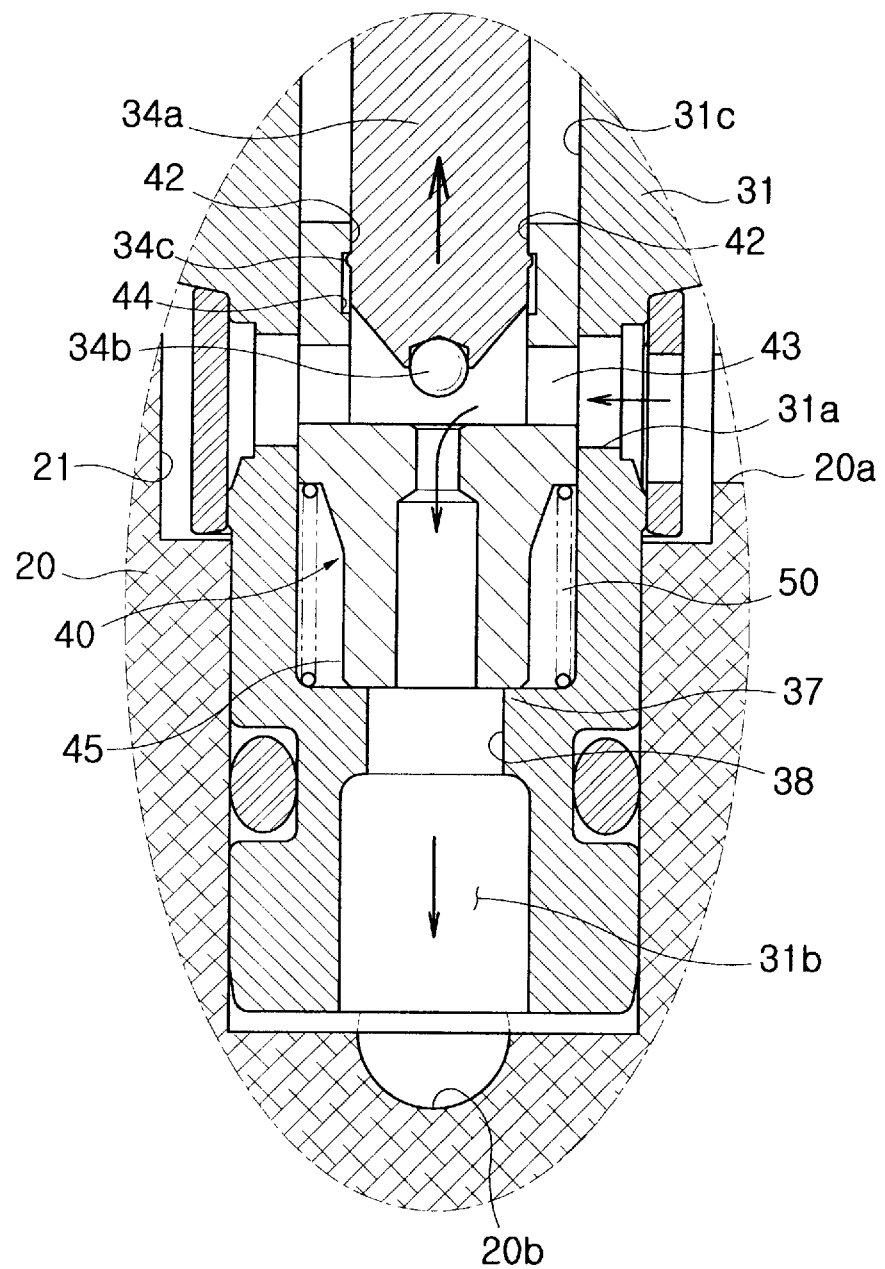

On the other hand, when electric power is applied to the exciting coil 35, the armature 34 moves toward the valve core 33 by electromagnetic force generated between the armature 34 and the valve core 33, thus opening the fluid passage of the valve. At this time, high braking pressure is applied to the inlet 31a of the valve housing 31, resulting in high pressure being applied to the spool 40. Thus, as shown in FIG. 5, the plunger 34a moves up prior to the upward movement of the spool 40, so the on-off ball 34b is spaced from the first orifice 41. That is, the first orifice 41 is firstly opened, so the fluid flows from the inlet 31a to the outlet 31b through the open first orifice 41.

Figure 6:
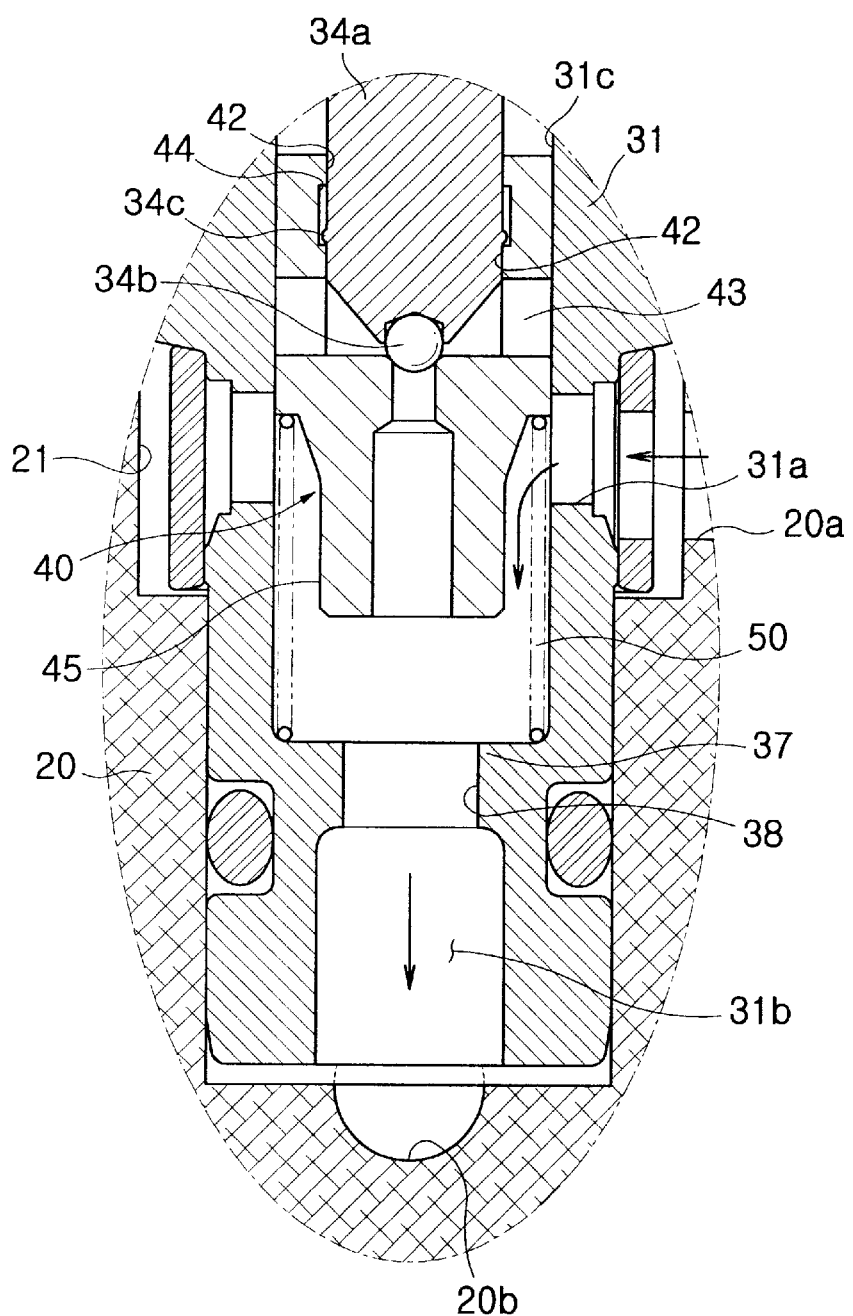

Since a predetermined quantity of fluid flows to the outlet 31b through the first orifice 41 of the spool 40, there is a reduced pressure difference between the inlet 31a and the outlet 31b. At this time, as shown in FIG. 6, the spool 40 secondarily moves up by the rising force transmitted to the spool 40 through the locking projection 34c of the plunger 34a and the elastic force of the spool restoring spring 50, and simultaneously the lower end of the spool 40 is spaced from the valve seat portion 37. That is, since the fluid flows from the inlet 31a to the outlet 31b through the second orifice 38 which has a larger diameter, the fluid passage is expanded, so the smooth flow of the fluid is ensured, thus rapidly increasing the pressure of the fluid line adjacent to the outlet 31b.

As such, according to this invention, the fluid passage of the valve is opened in two stages through the sequential upward movement of the armature 34 and the spool 40, so the valve can be opened with a weak force even when there is a large pressure difference between the inlet 31a and the outlet 31b. The volume of the exciting coil 35 is thus reduced. In addition, the fluid passage is expanded by the second orifice 38, thus rapidly increasing the pressure of the fluid line adjacent to the outlet 31b.

Further, in accordance with this invention, when the armature 34 is actuated in a valve opening direction when there is a small pressure difference between the inlet 31a and the outlet 31b, the lower end of the spool 40 is promptly opened by the elastic force of the spool restoring spring 50, so the fluid passage can be opened more rapidly.

Figure 7:
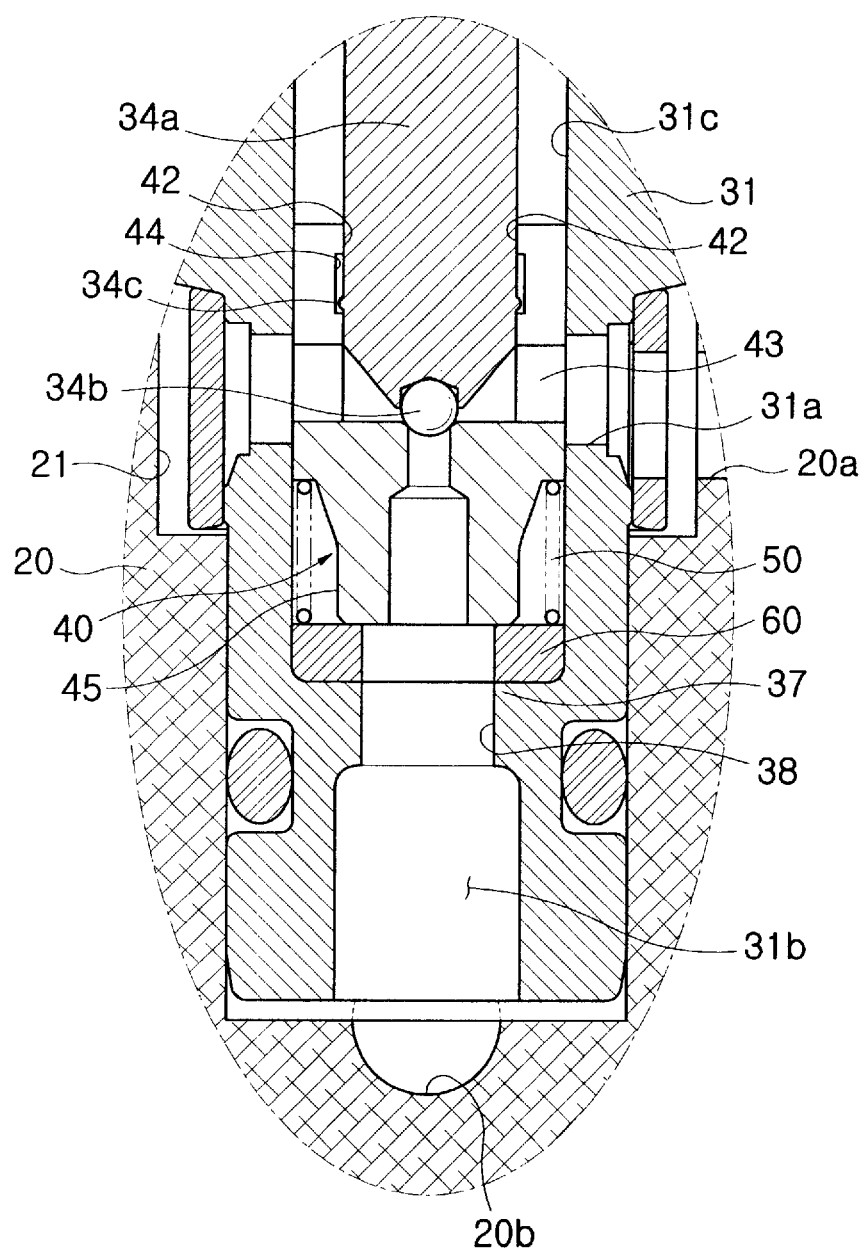
FIG. 7 is a sectional view of the solenoid valve for brake systems according to the second embodiment of this invention.

FIG. 7 shows the solenoid valve for brake systems according to the second embodiment of this invention. The solenoid valve of the second embodiment is different from that of the primary embodiment in that the solenoid valve of the second embodiment is provided with a reinforcing member 60. The reinforcing member 60 is installed between the lower end of the spool 40 and the valve seat portion 37 so as to prevent the valve seat portion 37 from being deformed by the spool 40 due to the frequent opening and closing operation of the valve. This reinforcing member 60 is made of a high strength material. The lower end of the spool restoring spring 50 is laid on the upper surface of the reinforcing member 60. The elements of the second embodiment are common with those of the primary embodiment excluding the reinforcing member, thus the elements common to both embodiments will not be described herein in detail.

The reinforcing member 60 is designed such that it is provided with an axial passage having a size which is equal to the second orifice 38. The member 60 is pressure-fitted into the bore 31c of the valve housing 31. The reinforcing member 60 is made of a heat-treated metal having superior abrasion resistance and strength to the valve seat portion 37 so as to prevent the valve seat portion 37 from being deformed. Such construction with the reinforcing member 60 allows that the elements for opening and closing the valve be prevented from deformity due to shock generated from the frequent opening and closing operation of the valve and the highly pressurized fluid, thus giving excellent durability to the valve.

As described above, the present invention provides a solenoid valve for brake systems, which is sequentially opened or closed in two stages by a spool set in the valve housing under an armature, thus being easily opened and closed with a weak force even when unexpected large braking pressure is applied to the fluid inlet.

Further, the present invention allows the valve to be opened and closed with a weak force, thus reducing the volume of an exciting coil which actuates the armature.

In addition, according to this invention, the fluid flows into the inlet by an upward movement of the spool, and then flows to the outlet through the second orifice which has a larger diameter, thus rapidly increasing the pressure of a fluid line adjacent to the outlet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solenoid valve for brake systems having a hollow valve housing provided on an outer circumferential surface thereof with a fluid inlet and provided on one end of the valve housing with a fluid outlet, and an armature provided with a plunger extending into a bore of the valve housing in such a way as to selectively open a fluid passage from the inlet to the outlet while moving by electric power, said solenoid valve comprising:

a spool movably set in said valve housing;

a first orifice having a predetermined diameter provided along a central axis of the spool;

a plunger guide inside the spool and provided at a position around the plunger, wherein the plunger guide has a predetermined depth for allowing the plunger to enter the spool and open or close the first orifice;

a valve seat portion formed on an inner surface of the bore of the valve housing by stepping said surface, said valve seat portion defining a second orifice therein and coming into contact with or being spaced from an end of said spool to selectively close or open said outlet separately from the first orifice, said second orifice having an inner diameter larger than that of the first orifice; and a spool restoring spring biasing the spool toward the plunger.

2. The solenoid valve according to claim 1, wherein stopping means is provided on each of an inner surface of the plunger guide and an outer surface of the plunger, and allows the plunger to move relative to the spool within a predetermined range, the stopping means of the plunger guide being caught by the stopping means of the plunger to allow the spool to be pulled by the plunger when the plunger moves beyond said predetermined range.

3. The solenoid valve according to claim 2, wherein said stopping means comprises:

a recess formed on the inner surface of the plunger guide, and having a predetermined width in an axial direction of the spool; and a locking projection protruding from the outer surface of the plunger so as to engage with said recess.

4. The solenoid valve according to claim 1, wherein a spring holding portion is formed on an outer surface of the spool at a position around the valve seat portion, said spring holding portion defining a space for seating the spool restoring spring, and having an outer diameter smaller than an inner diameter of the bore of said valve housing for allowing fluid to flow from the inlet to the outlet when the spool is spaced from the valve seat portion.

5. The solenoid valve according to claim 1, wherein at least one radial path is formed on the plunger guide of the spool such that the first orifice communicates with the inlet through the at least one radial path.

6. The solenoid valve according to claim 1, wherein a reinforcing member, made of a material having strength higher than that of the valve seat portion, is installed on said valve seat portion to prevent the valve seat portion from being deformed when the valve seat portion comes into contact with the spool.

* * * * *